(12) United States Patent
Schroeder et al.

(10) Patent No.: US 12,409,749 B2
(45) Date of Patent: Sep. 9, 2025

(54) ELECTRIC VEHICLE CHARGER WITH AUTOMATED GRID-MANAGEMENT AND VEHICLE-TO-HOME ISOLATION/BACKUP

(71) Applicant: ConnectDER, Inc., Falls Church, VA (US)

(72) Inventors: John Schroeder, Falls Church, VA (US); Whitman Fulton, Falls Church, VA (US)

(73) Assignee: ConnectDER, Inc., Falls Church, VA (US)

( * ) Notice: Subject to any disclaimer, the term of this patent is extended or adjusted under 35 U.S.C. 154(b) by 0 days.

(21) Appl. No.: 17/307,426

(22) Filed: May 4, 2021

(65) Prior Publication Data

US 2021/0276442 A1  Sep. 9, 2021

Related U.S. Application Data

(60) Provisional application No. 62/986,025, filed on Mar. 6, 2020.

(51) Int. Cl.
*B60L 53/60* (2019.01)
*H02J 7/00* (2006.01)
*H02J 13/00* (2006.01)

(52) U.S. Cl.
CPC ............ *B60L 53/60* (2019.02); *H02J 7/0029* (2013.01); *H02J 13/00002* (2020.01)

(58) Field of Classification Search
CPC .......... B60L 53/60; B60L 53/57; B60L 53/63; B60L 55/00; H02J 7/0029; H02J 13/00002; H02J 13/001; H02J 13/322; H02J 3/001; H02J 3/322; Y02B 70/30; Y02E 60/00; Y02T 10/70; Y02T 10/7072; Y02T 90/12; Y02T 90/167; Y04S 10/126
See application file for complete search history.

(56) References Cited

U.S. PATENT DOCUMENTS

| | | | |
|---|---|---|---|
| 2010/0003848 A1* | 1/2010 | Scott | H01R 9/2491 29/729 |
| 2012/0217928 A1* | 8/2012 | Kulidjian | B60L 3/0069 307/131 |
| 2014/0127935 A1* | 5/2014 | Scott | H01R 33/945 439/517 |
| 2014/0218010 A1* | 8/2014 | Fulton | G01R 22/065 324/110 |
| 2016/0006253 A1* | 1/2016 | Saussele | H02J 3/38 307/24 |
| 2016/0236634 A1* | 8/2016 | Parks | B60L 53/63 |

(Continued)

*Primary Examiner* — Julian D Huffman
*Assistant Examiner* — Johali A Torres Ruiz
(74) *Attorney, Agent, or Firm* — Foley & Lardner LLP

(57) ABSTRACT

An interface to an electric vehicle or comparable energy storage system, paired with a utility electric power meter or meter collar adaptor with embedded control and whole-site disconnect switch that, when operated together, enables the user to: isolate the site from the grid during a power outage and use the vehicle or energy storage system to provide power to the site; manually reclose the disconnect switch to the grid only when safe operating conditions are met; allow a remote grid-operator to manage charging of the vehicle; and prevent the utility service from being overloaded when proving power to the residence and the meter adaptor loads simultaneously.

17 Claims, 23 Drawing Sheets

(56) References Cited

U.S. PATENT DOCUMENTS

| | | | |
|---|---|---|---|
| 2019/0081458 A1* | 3/2019 | Lapushner | H02J 9/06 |
| 2021/0098994 A1* | 4/2021 | White | H02J 7/02 |
| 2021/0109142 A1* | 4/2021 | Karlgaard | H02J 7/34 |

* cited by examiner

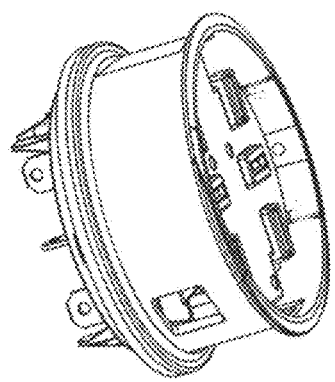
FIG. 14A
Islanding Meter Socket Adaptor
FIG. 14B
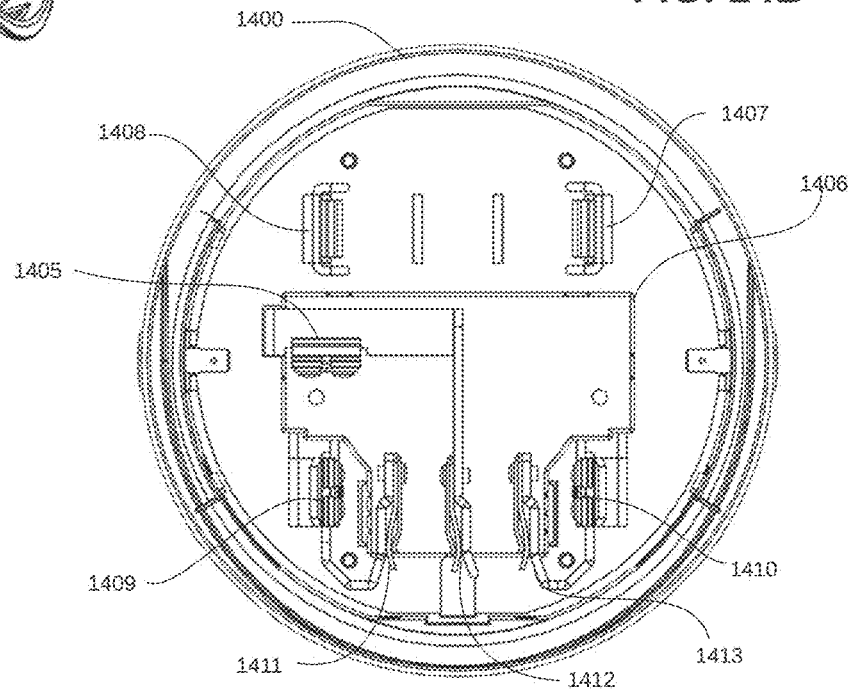
FIG. 14C
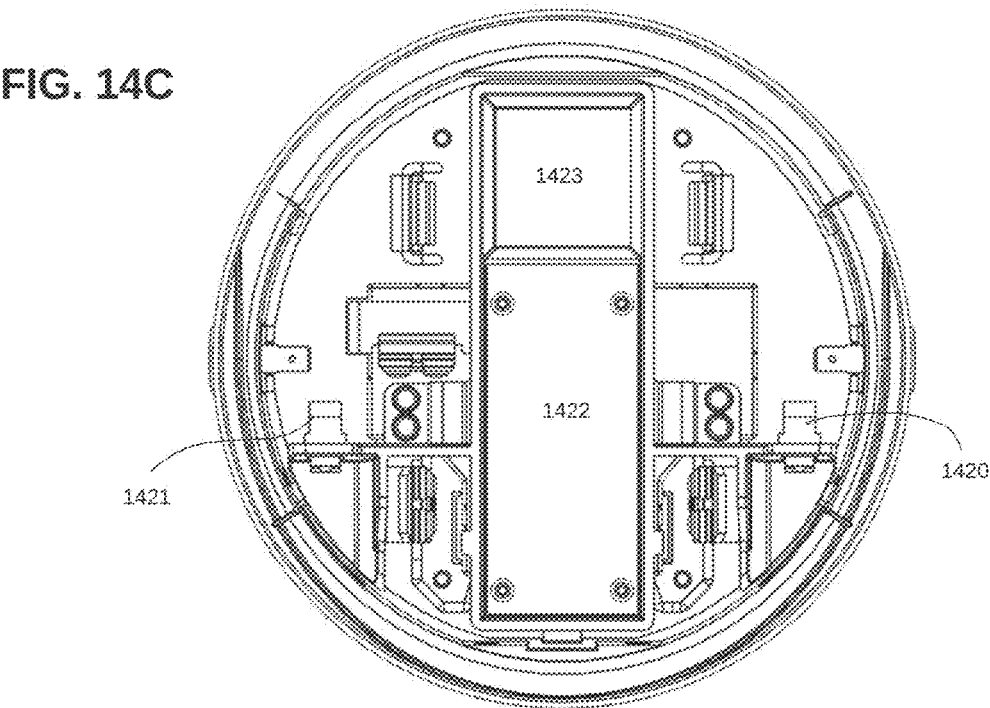

Interface Connections

Back View
FIG. 16A          1600
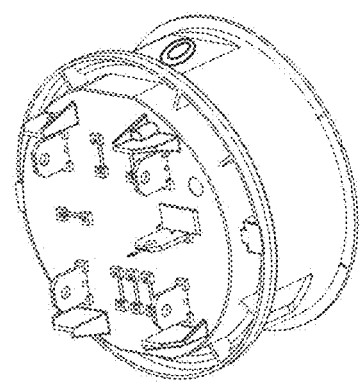
FIG. 16B
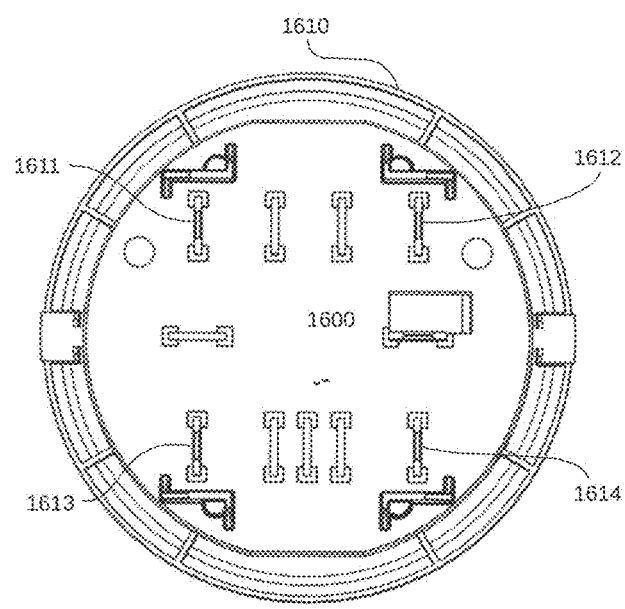

Adapter with Conduit

Adapter without Conduit

Circuit Breaker in Interface

Interface Mating
FIG. 20A
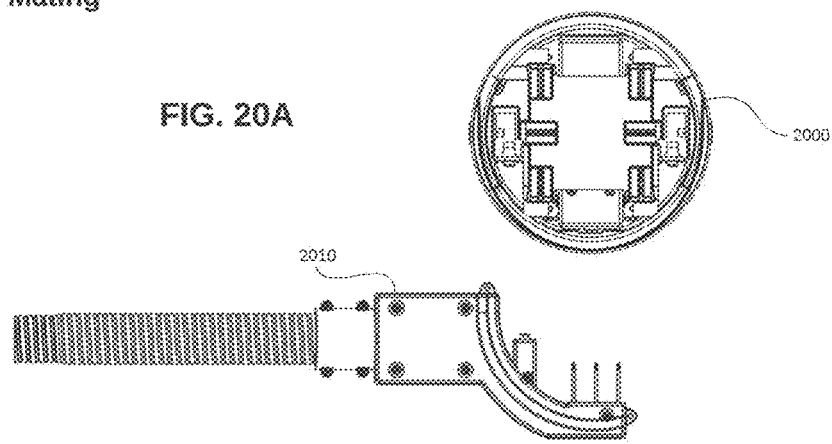
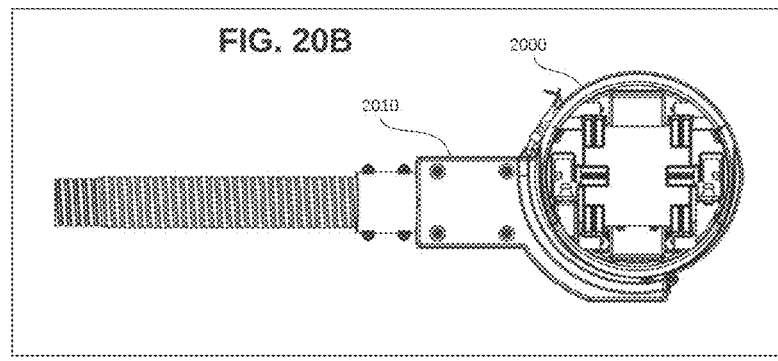
FIG. 20B

Behind The Meter Reversible
Interface

Front of The Meter Interface

ELECTRIC VEHICLE CHARGER WITH AUTOMATED GRID-MANAGEMENT AND VEHICLE-TO-HOME ISOLATION/BACKUP

TECHNICAL FIELD

The embodiments described and recited herein pertain, generally, to electrical power storage and deployment.

BACKGROUND

Electric vehicles (EVs) utilize battery packs, which include electrical energy storage systems that provide energy to power the vehicle and its accessories. The energy storage system corresponding to some EVs may be utilized for other purposes external to the EV itself, including powering small loads from appliances, powering site-level loads, or even returning power to the utility electric grid.

More broadly, electrical energy storage, whether housed in an EV or not, is falling in cost and increasing in prevalence. It can provide grid stability, generation cost reduction, and, when installed on-site with electrical loads, can keep those loads powered during grid outages.

SUMMARY

In accordance with another example embodiment, a consumer-side power distributor includes a first interface to bi-directionally electrically interface with a public utility-facing meter socket and a second interface to bi-directionally electrically interface with an electric vehicle charger.

In accordance with another example embodiment, a system includes utility-side power source, a customer-side power distribution system, and a meter socket to interface that serves as an electrical interface for the utility-side power source and the customer-side power distribution system. The customer-side power distribution system includes an electric vehicle charger and an islanding meter socket adaptor to electrically facilitate a bi-directional interface between the electric vehicle charger and the utility-side power source, via the meter socket.

In accordance with yet another example embodiment, a meter collar adaptor provides an interconnection point between the electric grid and a site's electric network for an energy storage system housed in an EV or otherwise weatherized for outdoor siting. The adaptor furthermore contains a disconnect switch that opens under certain conditions to isolate the site and the energy storage system below the circuit from the grid, and that is manually resettable so long as other safety conditions are met. An onboard computing system within the adaptor contains measurement of the power and related aspects flowing through the adaptor, data processing, data communications, and a data connection to the energy storage system to manage its operation in response to signals from the computing system. An associated EV charger provides a user interface to set operating modes for the energy storage system.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different FIG.s indicates similar or identical items.

FIG. 14A shows a side view of an adaptor, in accordance with at least one example embodiment described and recited herein;

FIG. 14B shows a front view of an adaptor, in accordance with at least one example embodiment described and recited herein;

FIG. 14C shows a review of an adaptor, in accordance with at least one example embodiment described and recited herein;

FIG. 16A shows a side view of a socket adaptor, in accordance with at least one example embodiment described and recited herein;

FIG. 16B shows a planar view of a socket adaptor, in accordance with at least one example embodiment described and recited herein;

FIG. 20A shows a mating of a socket adaptor and adaptor interface, in accordance with at least one example embodiment described and recited herein;

FIG. 20B shows the mated socket adaptor and adaptor interface of FIG. 20A, in accordance with at least one example embodiment described and recited herein;

DETAILED DESCRIPTION

Figure 1:
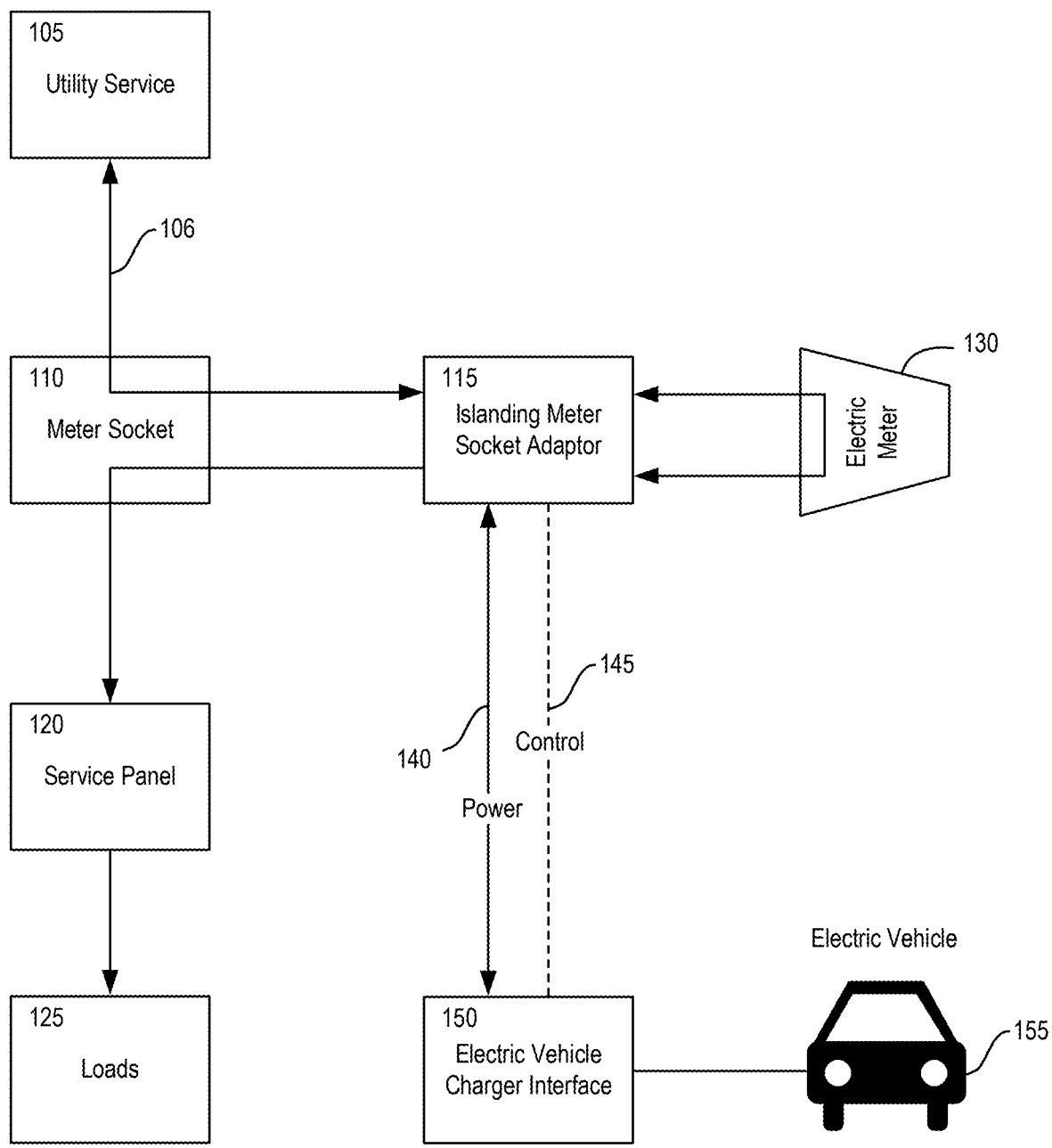
FIG. 1 shows a schematic drawing of a power distribution system, in accordance with at least one example embodiment described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Described and recited herein are embodiments of an electric vehicle charger and related energy storage devices having grid-management capabilities and on-site powering capabilities. The present embodiments, which are not intended to be limiting, present cost-effective solutions while adhering to regulated standards, e.g., National Electrical Code rules. Further, the embodiments described and recited herein are weather agnostic, i.e., deployment and operation thereof are not dependent upon moderate temperature ranges and do not require installation in a weatherized environment. Further still, the embodiments described and recited herein include dedicated circuits and/or switch gear to implement ride-through of a site-level power outage.

An example embodiment of the invention includes a complete electric vehicle or related battery storage system comprised of battery and power electronics housing and meter adaptor or meter connected by a pluggable interface. In addition, batteries, power electronics for control, current sensing, local area communication and utility communications may reside in the battery housing. Utility communications use either cellular or advanced metering infrastructure for communications. A meter or plastic meter collar containing grid voltage sensing, line-side disconnect, connection for plug terminals, and whole-house current sensing. Control software for battery power with multiple settings including—grid support, islanded home back up, electric vehicle support. Software makes decisions from circuit specific requirements due to each site's specific address and connection to grid. An onboard computing platform can be used to make local autonomous decisions about the best mode of operations, either in isolation or in coordination with other systems. A learning algorithm may be implemented to increase the efficiency of the operational decision making.

FIG. 1 shows a schematic drawing of a power distribution system, in accordance with at least one example embodiment described and recited herein. As depicted, system 100 includes, at least, utility service 105, meter socket 110, islanding meter socket adaptor 115, service panel 120, loads 125, electric meter 130, electric vehicle charger interface 150, and electric vehicle 155.

Utility service 105 may refer to a public utility distribution system that supplies two-phase power via a meter to a customer.

Meter socket 110 may refer to a socket having utility-side contacts to interface with utility service 105 and customer-side contacts to electrically connect to a customer's private distribution system, e.g., islanding meter socket adaptor 115 and service panel 120.

Islanding meter socket adaptor 115 may refer to a device depicted in FIG. 14A that plugs into the meter socket 110 and resides between the meter socket and electric meter 130.

Service panel 120 may refer to the main service panel that provides a distribution point for the customer's loads 125. This panel usually contains circuit protection devices and terminal points that enable the distribution of power through the private facility.

Loads 125 may refer to the typical loads found in a private facility. Some examples of typical loads include, but not limited to, electric appliances, air conditioners, electric hot water heaters, and electric outlets.

Electric meter 130 may refer to a power metering device that plugs into the Islanding meter socket adaptor 115. Electric meters are typically utilized to monitor the power consumption or production at a Utility customer's facility for the purpose of billing for the utility service.

Electric vehicle charger interface 150 may refer to a charger interface that may interact with islanding meter socket adaptor 115 to safely enable an electric vehicle 155 to connect to the load side of meter socket 110. In accordance with at least one example embodiment described and recited herein, electric vehicle charger interface 150 resides onboard electric vehicle 155 to reduce the number of external enclosures needed for system 100. Alternative form factors include separate enclosures that house EV car chargers or other multi source backup inverters.

In accordance with one example operational flow, as described and recited herein, power may be supplied to electric vehicle charger interface 150, via utility service 105, meter socket 110, islanding meter socket adaptor 115, and wires 140; and communications in the form of digital or analog signals from, e.g., monitoring and control circuit 910 (see FIG. 9), to enable or disable the connection of the electric vehicle backup source 155 may supplied be to electric vehicle charger interface 150 via wires 145. In addition, control interface 145 may communicate with the electric vehicle inverter 155 to modify the inverters parameters including, but not limited to, power output level or power factor compensation.

In accordance with at least one example implementation, power may be routed directly from load 125 side of islanding meter socket adaptor 115 to electric vehicle charger interface 150. In accordance with at least one additional or alternative implementation, electric vehicle 155 may supply power to the grid or to loads 125. The aforementioned implementations may be enacted depending on program settings, determined by the local utility regulations and end user inputs, programed into the monitoring and control circuit (see FIG. 9).

In accordance with a non-limiting example implementation, in the event of a grid outage, islanding meter socket adaptor 115 may be configured to disconnect from the grid, i.e., utility service 100, while maintaining an electrical connection to electric vehicle charger interface 150 as well as electric vehicle 155 and to service panel 120, thereby supplying power from electric vehicle 155 to loads 125. Islanding meter socket adaptor 115 may be configured to inform the electrical vehicle charger interface 150 that the islanding relay contacts are open by sending a signal over the control interface 145. Accordingly, electrical vehicle charger interface 150 may enable the grid forming power 740 supply by switching the grid forming switch 715 to the electric vehicle grid forming interface 740 position to energize the power connection and pick up the service panel loads 125.

Figure 2:
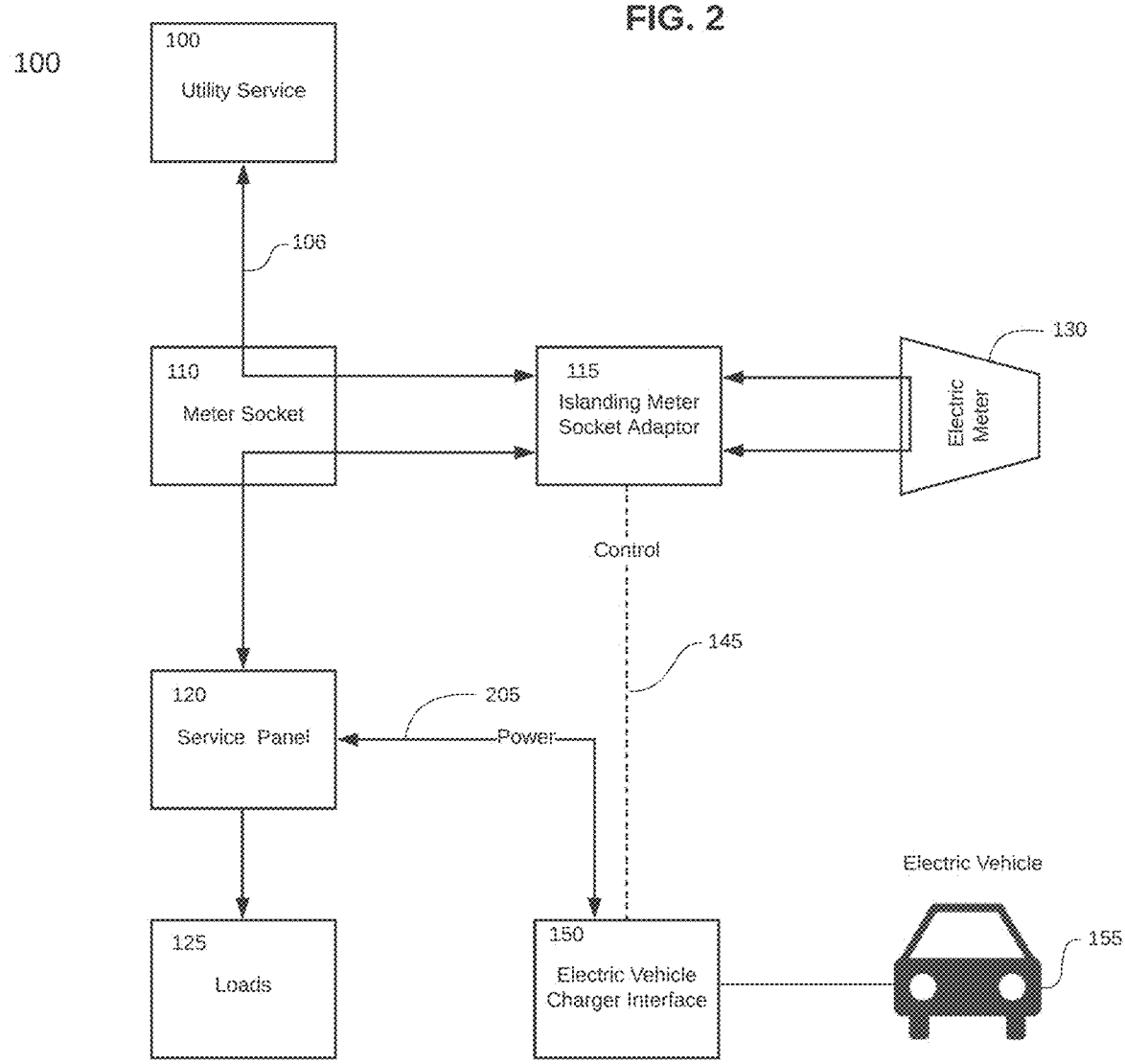
FIG. 2 shows a schematic drawing of a power distribution system, in accordance with at least one example embodiment described and recited herein.

FIG. 2 shows a schematic drawing of a power distribution system, in accordance with at least one other example embodiment described and recited herein. As depicted, similar to system 100, system 200 includes, at least, utility service 105, meter socket 110, islanding meter socket adaptor 115, service panel 120, loads 125, electric meter 130, electric vehicle charger interface 150, and electric vehicle 155.

In accordance with at least one example embodiment, power lines 200 electrically connect charger interface 150 and service panel 120. In at least one example implementation, charger interface supports charging of electric vehicle 155 as well as, in accordance with at least one additional or alternative implementation, discharging of electric vehicle 155 to supply power to loads 125 or to feed power back to utility service 105, i.e., the grid. That is, in the event of a power outage, a relay for meter socket adaptor may open to disconnect all downstream components from the grid, thus enabling EV 155 to provide backup power to loads 125.

Figure 3:
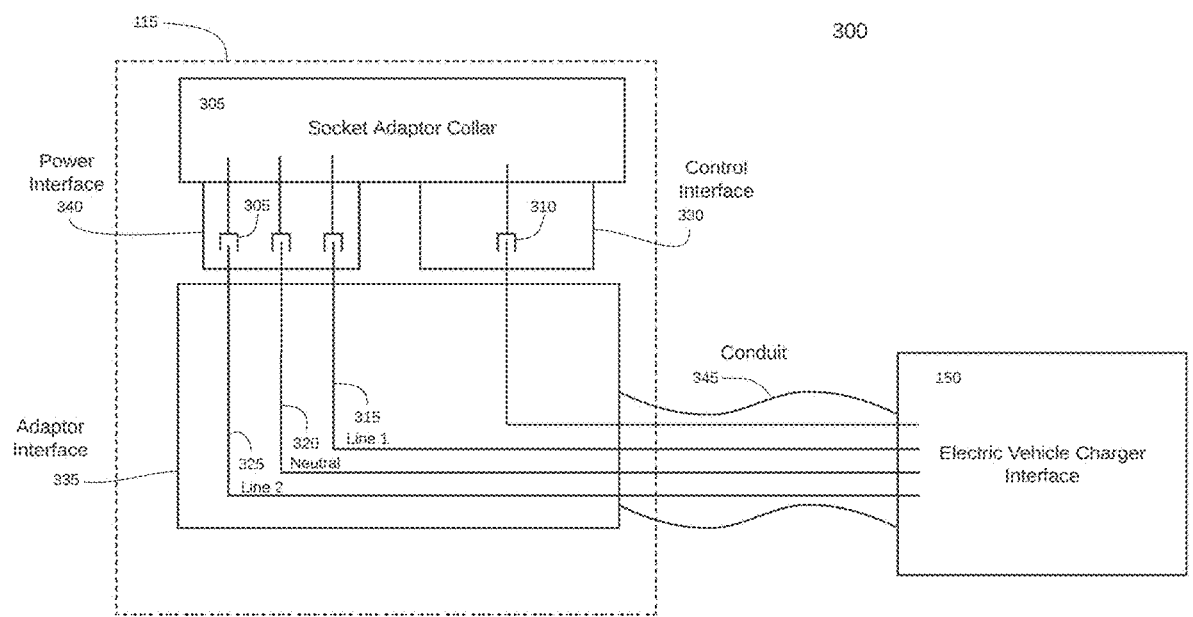
FIG. 3 shows a schematic drawing of an energy storage system, in accordance with at least one example embodiment described and recited herein.

FIG. 3 shows a schematic drawing of an energy storage system, in accordance with at least one example embodiment described and recited herein. That is, FIG. 3 shows islanding meter socket adaptor 115 interconnected at a site with electrical loads on a grid side circuit interconnection point, with power flowing between the grid, the site, and the energy storage system.

System 300 includes islanding meter socket adaptor 115 electrically connected to electric vehicle charger interface 150. As depicted, islanding meter socket adaptor 115 includes, at least, socket adaptor collar 305, control interface 330, adaptor interface 335, power interface 340, and conduit 345.

Adaptor interface 335 houses the mating connectors for the power and control interfaces which may be electrically connected to socket adaptor collar 305, via power interface 340, which may have plug type connectors for, e.g., AC power Line 1 (315), Line 2 (325), and Neutral (320).

Socket adaptor collar 305 may be implemented as a meter socket adaptor depicted in FIG. 14A. The meter socket adaptor houses the islanding relay 920 and, when mounted in meter socket 110, facilitates its insertion between the utility service 100 and the service panel 120 and further provides a location for the backup power supply connection facilitated by the mating of the adaptor interface 335 and power interface 340.

Control interface 330 may be integrated with the islanding meter socket adaptor 115 collar and houses the connectors used to route the control 10 signals from the islanding meter socket adaptor 115 collar to the adaptor interface 335 through the connections 310. This communication is used to control the grid forming switch 715. In addition, the communications may control EV backup source 155 to vary its output based upon desired system setpoints. The communications may be implemented in many forms including but not limited to digital IO, analog IO, and industrial standard serial protocols.

Power interface 340 may be configured to house pluggable connectors 305 designed to pass backup power to the socket adaptor collar 305. These connectors are appropriately sized to pass voltage and current required for the backup power level. Typical electric vehicle backup sources could provide up to 24,000 Watts or more of power to the private facility. For a 240 Volt service this would require connectors capable of carrying up to 100 amps of current.

Conduit 345 may be provided to facilitate AC power connectivity between islanding meter socket adaptor 115 and electric vehicle charger interface 150.

Figure 4:
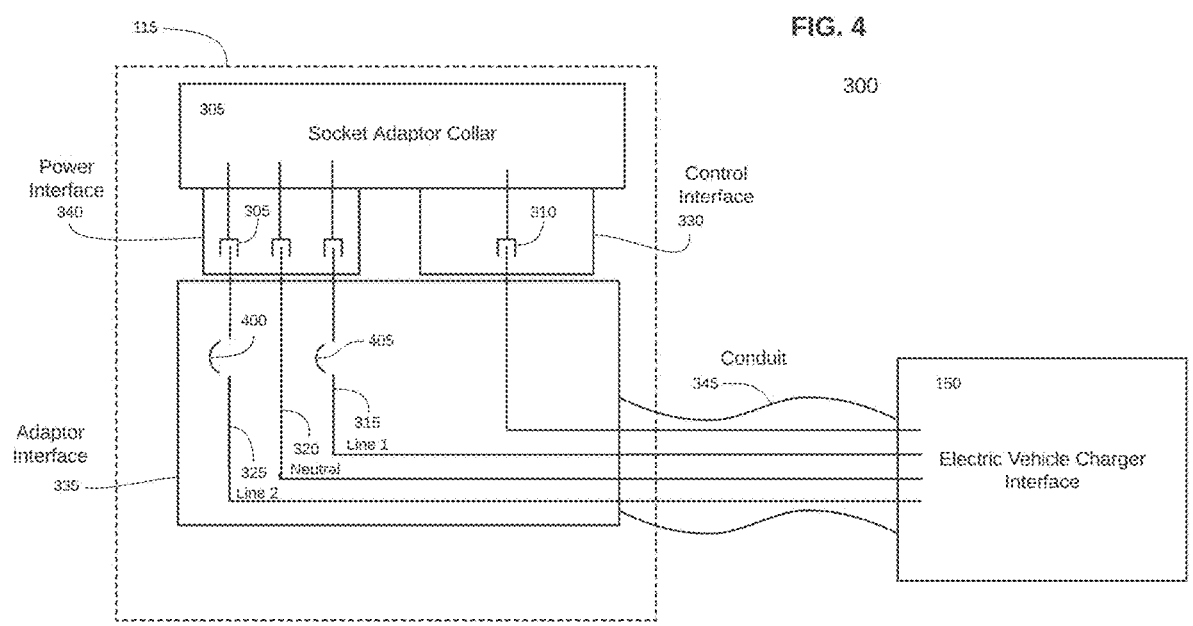
FIG. 4 shows a schematic drawings of an energy storage system, in accordance with at least one example embodiment described and recited herein.

FIG. 4 shows a schematic drawing of an alternative embodiment of 300, in accordance with at least one other example embodiment described and recited herein.

As depicted in FIG. 4, system 300 further includes circuit breakers 400 and 405 that are integrated into the adaptor interface 335 providing circuit protection. Since socket adaptor 115 facilitates a power connection directly to utility service entrance ate the meter socket 110, circuit protection is provided between the service entrance connection 110 and the electric vehicle backup source 155 as close as practical to the service entrance at the meter socket 110. The adaptor interface 335 is a convenient location to place this circuit protection since it is close to the service entrance and it can be easily replaced if needed. The circuit protection can consist of, but is not limited to, circuit breaks or fuses rated for the power flow being provided by the backup source.

Figure 5:
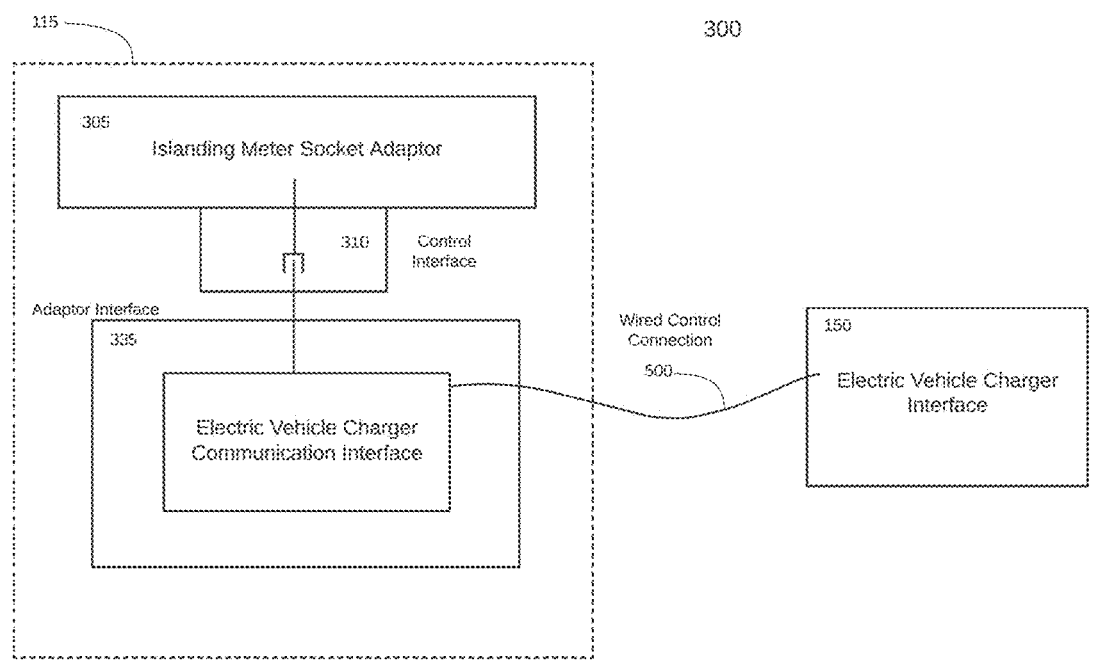
FIG. 5 shows a schematic drawings of an electrical path corresponding at least one example embodiment of a weatherized energy storage system as described and recited herein.

FIG. 5 shows a schematic drawings of an electrical path corresponding at least one example embodiment of system 300, as described and recited herein.

As depicted in FIG. 5, system 300 includes islanding meter socket adaptor 115 electrically connected to electric vehicle charger interface 150. As depicted, islanding meter socket adaptor 115 includes, at least, socket adaptor collar 305, control interface 330, adaptor interface 335, power interface 340, and conduit 345.

Control interface 310 may facilitate an electrical connection between islanding meter socket adaptor 305 and electrical vehicle charger communication interface 335. Control interface 310 is the connection point for IO signals that inform electrical vehicle charger interface 150 of the islanding relay status and interactively communicate with the EV backup supply 155. This connection may be made with a multi-pin low power signaling connector. Low power electrical signals are typically below the thresholds for limited power circuits as defined by the National Electric Code (NEC).

Wired control connection 500 is one method for establishing a signaling connection between electric vehicle charger communication interface 335 and electric vehicle charger interface 150. Wired control connection 500 may carry signals and communication traffic between the monitoring and control circuitry 910 to electrical vehicle charger interface 150.

Figure 6:
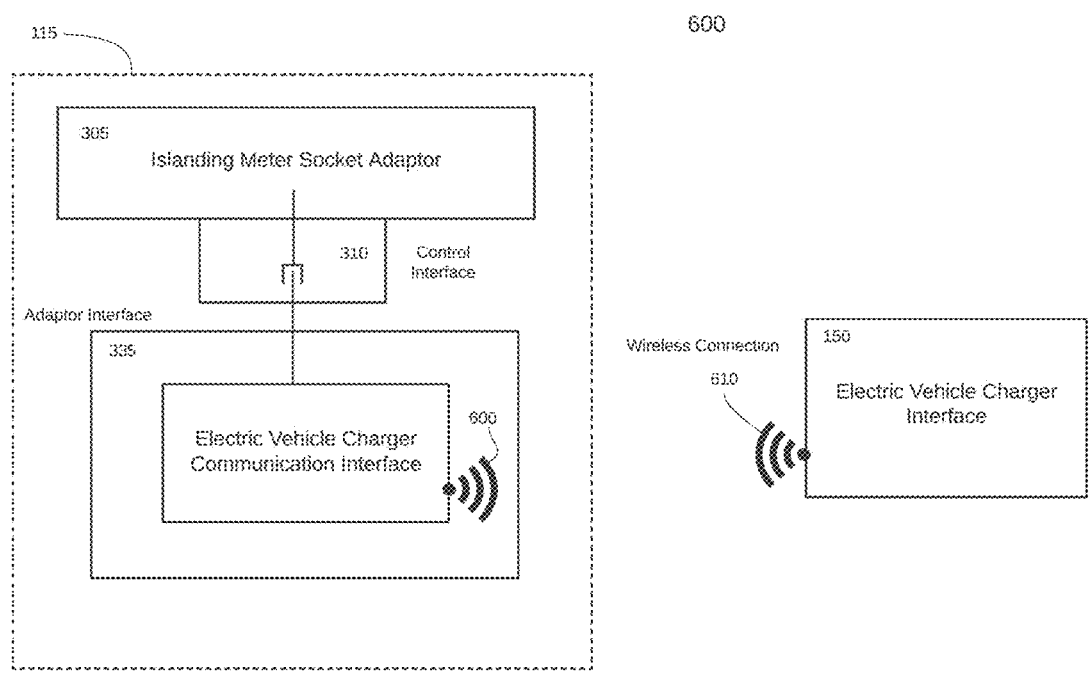
FIG. 6 shows a schematic drawings of a wireless communications path corresponding at least one example embodiment of an energy storage system as described and recited herein.

FIG. 6 shows a Schematic drawing of an alternative embodiment of system 300, as described and recited herein.

As depicted in FIG. 6, system 300 further includes wireless communications path 610 to 600 between electric vehicle charger communication interface 335 and electric vehicle charger interface 150. Further, control interface plug 310 may be provided to electrically connect islanding meter socket adaptor 305 and electric vehicle charger communication interface 335. Wireless communications protocols implemented between wireless interfaces 600 and 610 may include, but not be limited to, Wi-Fi, PLC, BPL, etc.

Figure 7:
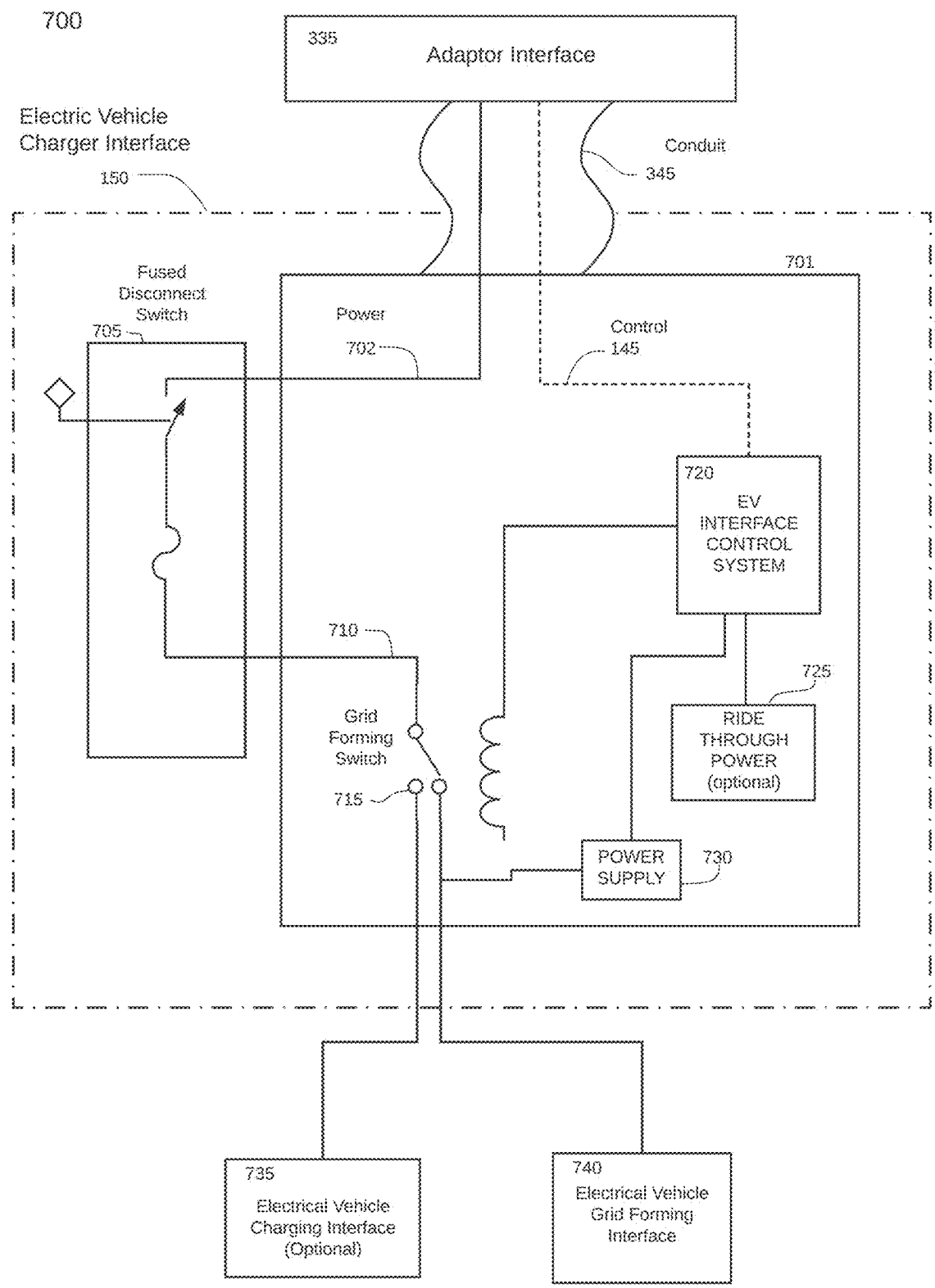
FIG. 7 shows a schematic drawing of the electric vehicle charger interface, in accordance with at least one example embodiment described and recited herein.

FIG. 7 shows a schematic drawing of the electric vehicle charger interface, in accordance with at least one example embodiment described and recited herein.

Electric vehicle charger interface 150 may be configured or designed to switch between normal grid-based vehicle charging and electrical vehicle-to-grid, or other backup power sourcing, protocols. Electrical vehicle charger interface 150 may reside in a separate enclosure that provides the interconnection between islanding meter socket adaptor 115 and the electric vehicle. The electrical vehicle charger interface houses the components needed to transfer the power connection to the grid forming interface in the event of a utility power outage.

As depicted in FIG. 7, electric vehicle charger interface 150 may include fused disconnect switch 705, grid forming switch enclosure 701, which houses the grid forming switch 715, electric vehicle interface control system 720, ride-through power 725, power supply 730. The electric vehicle charger interface provides terminal connections for the electric vehicle charging interface 735, and electric vehicle grid-forming interface 740.

Based on data regarding grid power status received via adaptor interface 115, electric vehicle charger interface 150 may operate internal grid forming switch 715 to charge electric vehicle 155; alternatively, based on the data regarding grid power status received via adaptor interface 115, electric vehicle charger interface 150 may operate internal grid forming switch 715 to switch to islanding mode to for devices capable of operating in islanding mode.

As referenced in the description and recitation herein, islanding may refer to the disconnection of the service panel 120 from a utility service such that the service panel 120 may be energized from EV backup source 155 through the islanding meter socket adaptor 115 without back feeding power onto the utility service.

Electric vehicle charger interface 150 may be powered either by power supply 730, which may be electrically connected to the electric vehicle grid forming interface 740, or by ride through power 725 located in the electric vehicle charger interface. Ride though power 725 may be included with the electric vehicle charger interface 150 to power the EV Interface Control system in the event that there is no utility or backup power and it is desired to keep the control system powered for status communications or indications. In this regard, vehicle charger interface electric vehicle charger interface 735 also includes fused disconnect switch 705, which provides circuit protection for the service entrance conductors 106 and additionally gives a visible disconnect for service personnel to open in for system maintenance.

Figure 8:
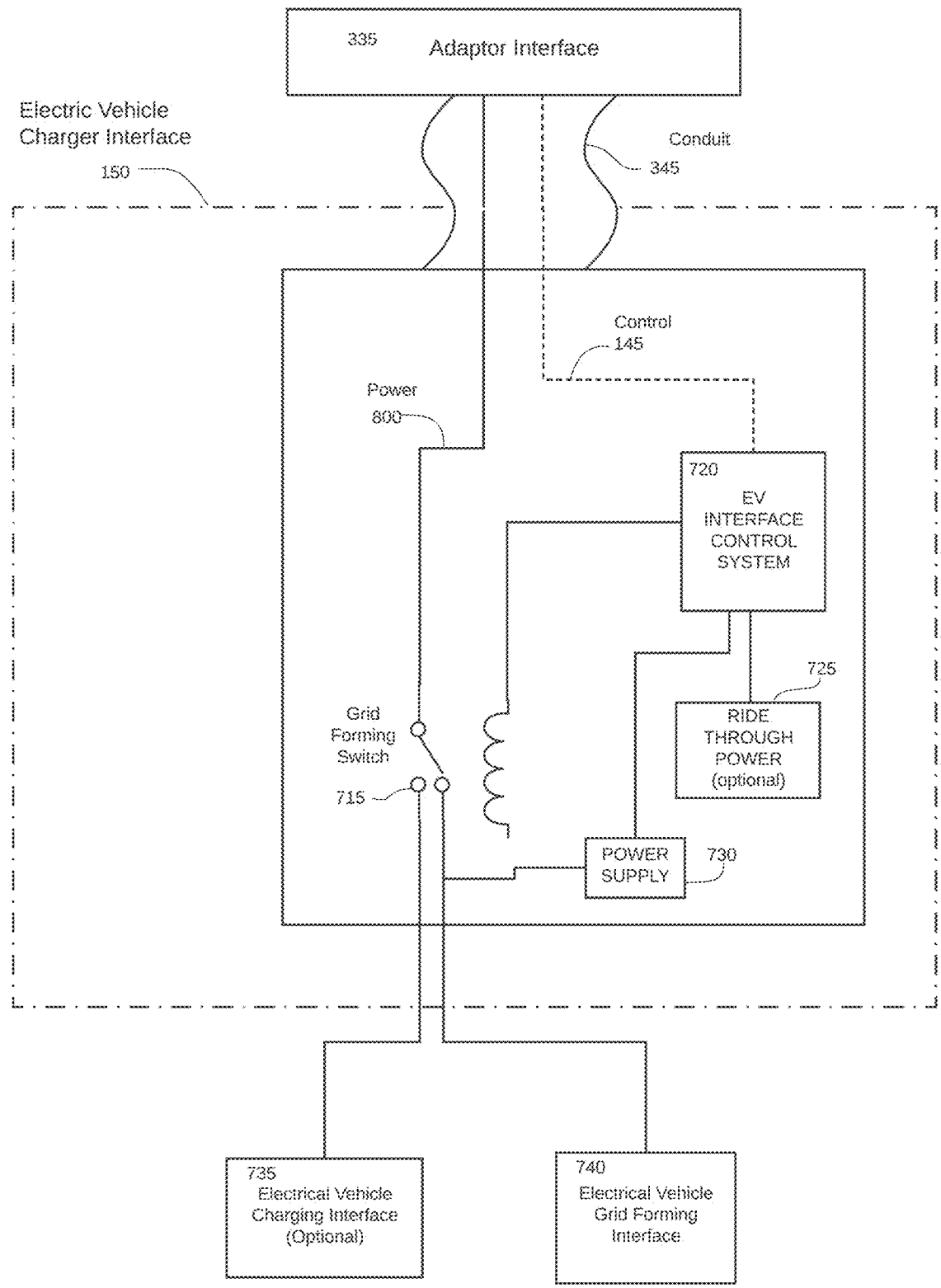
FIG. 8 shows a single line schematic drawing of the electric vehicle charger interface, in accordance with at least one other example embodiment described and recited herein.

FIG. 8 shows schematic drawing of an alternative embodiment of electric vehicle charger interface 700, in accordance with at least one other example embodiment described and recited herein.

As depicted in FIG. 8, system 700 does not include a fused disconnect switch. Accordingly, the fusing means would be integrated into the Adaptor Interface as shown in FIG. 4. By incorporating the circuit protection in adaptor interface 335, the fusible disconnect is no longer needed, thus reducing a number of components in the system.

Figure 9:
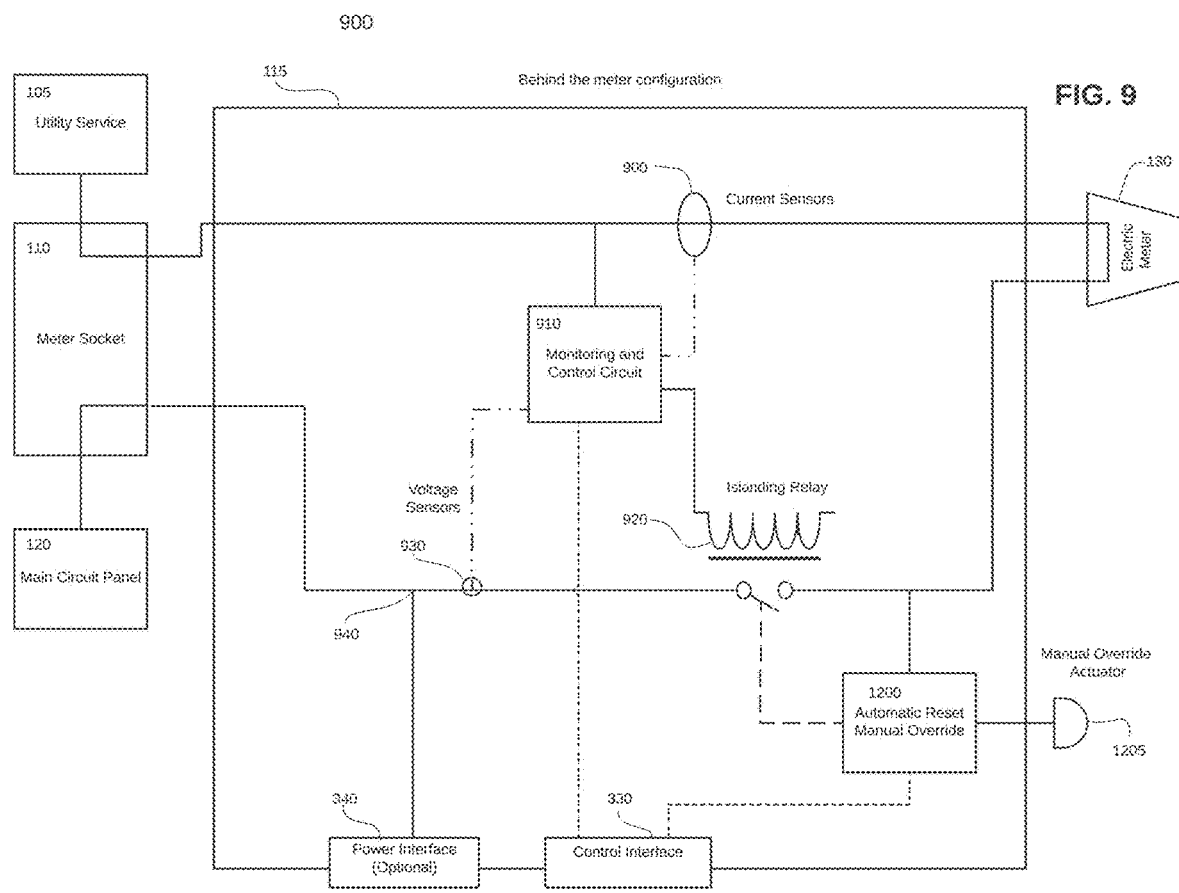
FIG. 9 shows a schematic drawing of a socket adaptor in accordance with at least one example embodiment described and recited herein.

FIG. 9 shows a schematic drawing of a socket adaptor in accordance with at least one example embodiment described and recited herein.

FIG. 9 depicts what may be referred to, as a non-limiting example, an islanding meter socket adaptor (IMSA), in accordance with a "behind the meter" (BTM) configuration.

As referenced herein, behind the meter refers to a configuration by which islanding relay 920 is located on a common electric side of electric meter 130 as main service panel 120. Accordingly, main service panel 120 may be electrically isolated from utility service 105, and thus power may be supplied through power interface 340 to supply loads wired into the main service panel 120. While islanding relay 920 may be open, power supplied through power interface 340 is not metered by electric meter 130. In this configuration, the backup source is usually provided by the facility owner and the generated power should not be recorded or billed by the utility. In addition, the backup power will not energize utility service 105, ensuring safety of maintenance personnel that may be handling components at utility service 105 during a utility power outage.

Islanding meter socket adaptor (hereafter "IMSA") 115 may couple electrically with meter socket 110 and also couple electrically with electric meter 130. Utility power may flow from utility service 105 to the meter socket 110, to IMSA 115, through electric meter 130, through islanding relay 920, to meter socket 110, and ultimately to the service panel 120 to power the connected loads. The islanding relay 920 is a latching relay that disconnects the utility power lines from the main service panel thus electrically islanding the main service panel from the utility service. Power can also flow in either direction from the adaptor interface 335 through power interface 340 to the power interconnection point 940. If a load is connected to the power interface, power will flow out of interconnection point 940 to supply the load. For example, a car charger will consume power to charge the electric vehicle batteries. If a power source is connected to the power interface, the power can flow into connection point 940. For example, a backup generator can source power that will flow into the connection point and supply the service panel loads.

Figure 11:
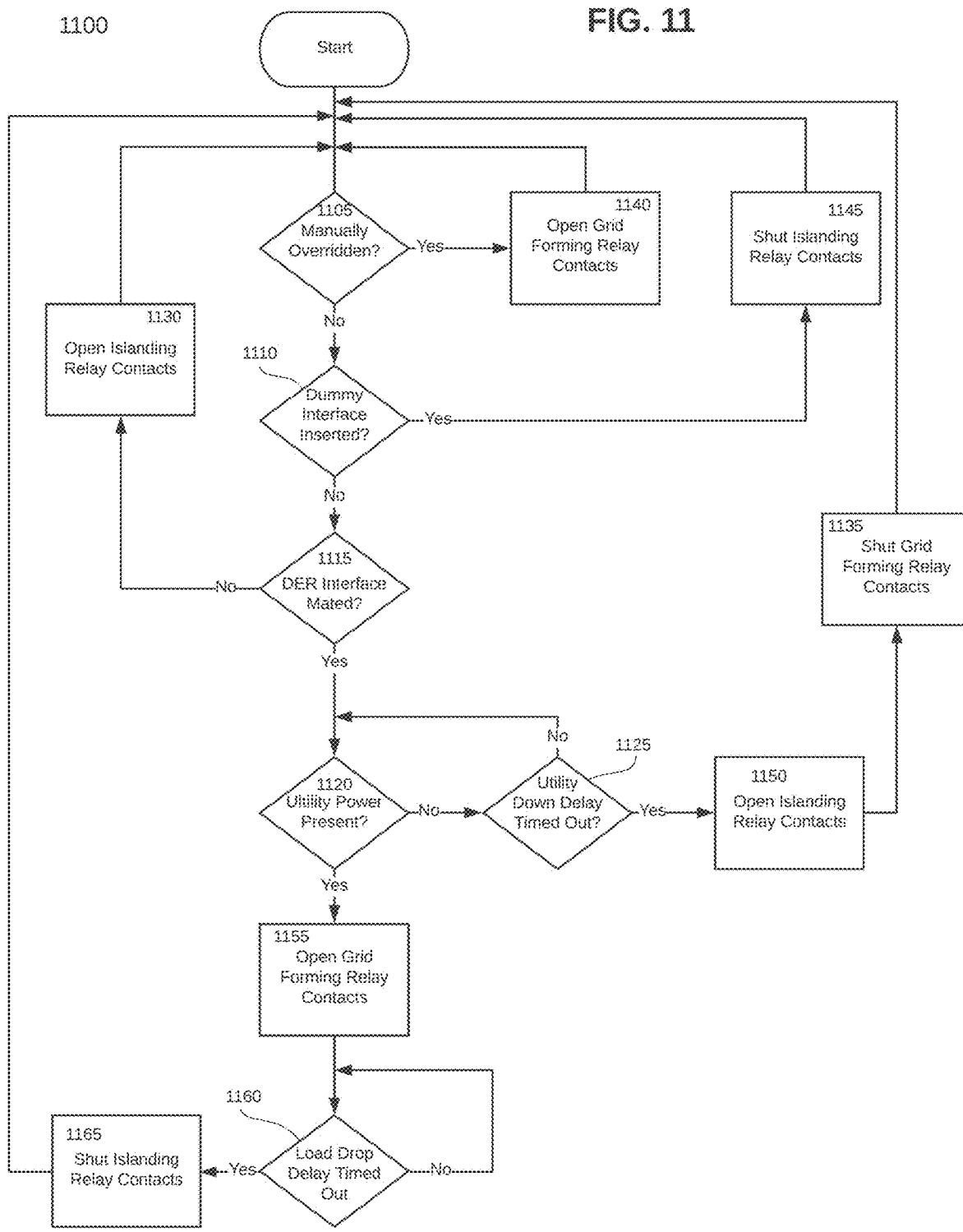
FIG. 11 shows an operation flow, in accordance with at least one example embodiment described and recited herein.

The IMSA 115 contains a monitoring and control circuit 910 that operates in concert with other control logic accessed through the control interface 330 to operate the islanding relay 920 in accordance with the logic depicted in FIG. 11. The control circuit's 210 power supply is auctioneered, meaning whichever power source is energized may power the circuit, whether the utility service inlet and the control interface 225 power line. This allows the control circuit to operate when either utility power 100 or the EV grid forming source 600 is online. In addition to controlling the relay, monitoring and control circuit 910 measures current sensors 900 and voltage sensors 930 to provide input into the control logic for operation of islanding relay 920 and information for auxiliary functions such as, but not limited to, controlling the power output of the EV backup source 155.

If control circuit 910 fails, the islanding relay 920 has the capability to be overridden by a manual override actuator 1205 which is externally accessible on the IMSA. The IMSA also contains an Automatic Reset Manual Override (ARMO) 1200 that will open and disable the manual override of the islanding relay 920. The ARMO 1200 only allows the islanding relay 920 to be overridden shut when both the electric vehicle power source is disconnected from the adaptor interface 335 and power is present on the utility service 100. This is an additional safety feature to prevent the Utility service 100 from being energized through the adaptor interface 335 when there is a power outage and maintenance is being performed on the utility system. The ARMO 1200 is totally separate from the control circuit 910 and is powered by the utility line so it will not be affected by a failure in the control circuit 910. The ARMO 1200 also provides override status to the control system for use in the control logic.

In addition to monitoring the current flowing from the Utility service 100, the Current sensors 900 can provide circuit protection for the service entrance components. When power is being supplied to the standard main service panel 120 and to an additional load through the power interface 340 it is possible to overload the meter socket 110 and utility service 100 drop. Typically, standard service panels include a main circuit protection device that are sized to the maximum service drop rating. In the event that the main service panel 120 draws the maximum amount of power from the service drop and an additional load is then connected to the interface adaptor power interface 340, the standard meter socket adaptor 110 is in danger of being overloaded. In this case, the current sensors 900 are used to detect the total load being serviced by the utility service 110. If the load rating is exceeded the monitoring and control circuit 910 will either disconnect the additional load by opening the grid forming switch 715 or send a signal to the load to reduce its draw such that the total draw is below the utility service rating.

Figure 10:
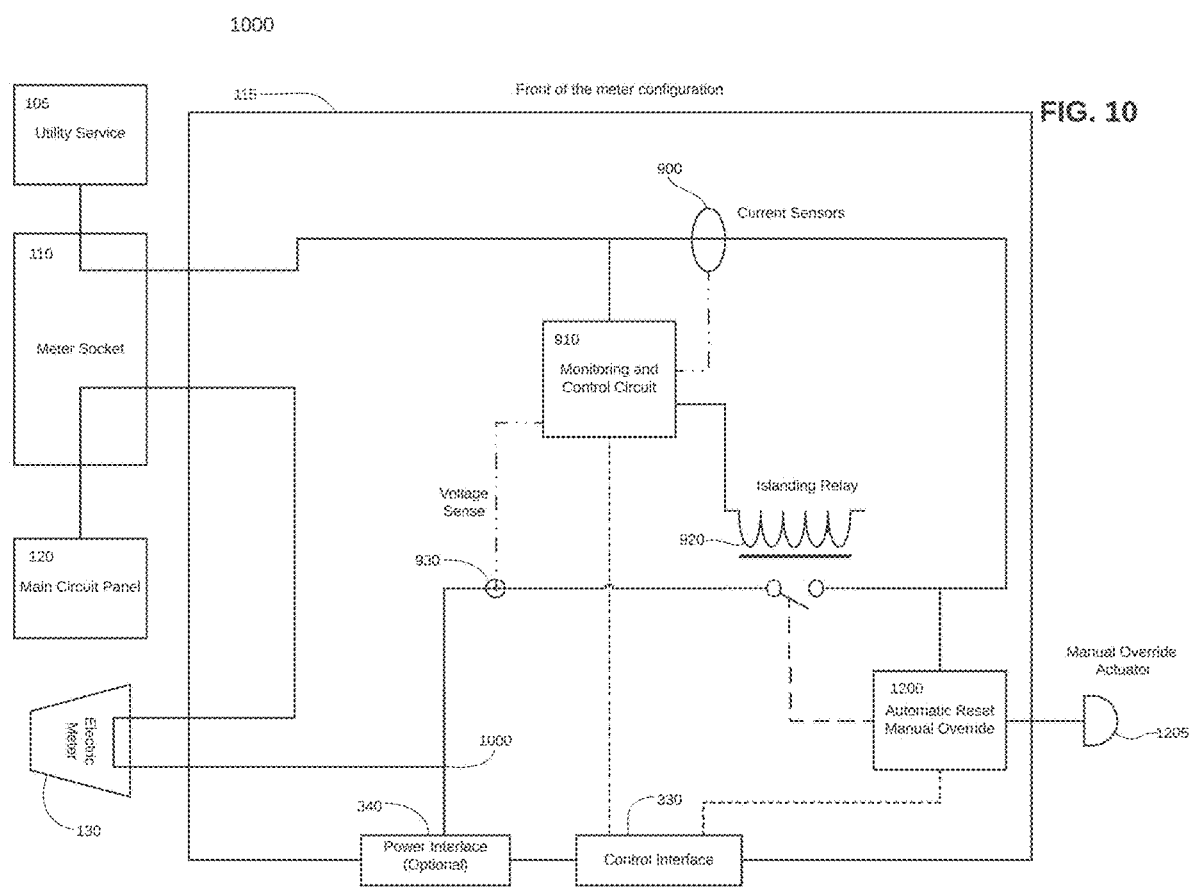
FIG. 10 shows a schematic drawing of a socket adaptor in accordance with at least one other example embodiment described and recited herein.

FIG. 10 shows a schematic drawing of a socket adaptor in accordance with at least one other example embodiment described and recited herein depicts the IMSA in the Front of The Meter (FTM) configuration. The components are essentially the same as the system depicted in FIG. 9 with the exception that the standard electric meter 130 is located on the other side of the islanding relay 920. This allows the power interface 340 to be connected to the utility service 100 side of the electric meter 130. This configuration is typically used when the power supply providing energy through the power interface 340 is considered a utility asset that can be metered through the standard electric meter 130 when the islanding relay 920 is open.

FIG. 11 shows an operation flow, in accordance with at least one example embodiment described and recited herein. The flow pertains to the resiliency logic used to operate the relays in the IMSA 115 and electric vehicle charger interface 150. This logic enables the safe application of electric vehicle grid forming power in the event of a utility power failure. It also prevents the power interface (Optional) 340 from being energized while the islanding adaptor interface 300 is unmated. This reduces the possibility of electric shock or spark while removing or mating the adaptor interface 335.

The logic starts 1100 when power is applied to the control circuit by either the Utility service 100 or the EV grid forming interface 740 source. Determining if the islanding relay 920 is manually overridden 1105 is the first decision. The ability to manually override the relay is controlled by the Automatic Reset Manual Override (ARMO) 1200 that operates in accordance with the logic depicted in FIG. 13. If the Islanding relay 920 is overridden, then the control system opens the grid forming relay 1140 contacts. If it is not overridden, then it continues to detect if a dummy adaptor interface is inserted 1110 into the IMSA 200.

The dummy adaptor interface is used to safely cover the IMSA interface ports when an active adaptor interface 335 is not in service. If the dummy adaptor interface is inserted, then the islanding relay 920 is shut 1145 so utility power can flow to the standard main service panel 120. If the dummy interface is not in place, then the system detects if an active adaptor interface 335 is mated 1115 as shown in FIG. 20B

If the adaptor interface is not mated, then the control system opens the islanding relay 920 contacts 1130 thus de-energizing the power interface 340. If the adaptor interface 335 is mated, then the system detects if power from the utility service 105 is present 1120. If the power from the utility service 105 is not present, then it waits for a utility down delay timed out 1125.

The utility down delay timed out 1125 is intended to prevent rapid cycling of the relay system and EV power source in the event of short power interruptions. An example of a short interruption occurs when utility power is lost due to an intermittent short circuit that is subsequently cleared after a breaker reclosing cycle. These interruptions typically are only several seconds in duration.

If the utility power is still down after the delay time out, the control system opens the islanding relay contacts 1150 and then shuts the grid forming relay contacts 1135 thus enabling the grid forming EV source to power 135 the main service panel 120.

If utility power is present, the control system opens the grid forming relay contacts 1155 and then waits for a short delay 1160 to allow the loads on the main panel to fully drop. Transferring load too quickly can cause large system transients induced in inductive or capacitive loads that could trip power sources or circuit breakers. Once the load drop delay has expired, the islanding relay contacts are shut 1165 and the service panel 120 is powered from the Utility service 100.

Figure 12A:
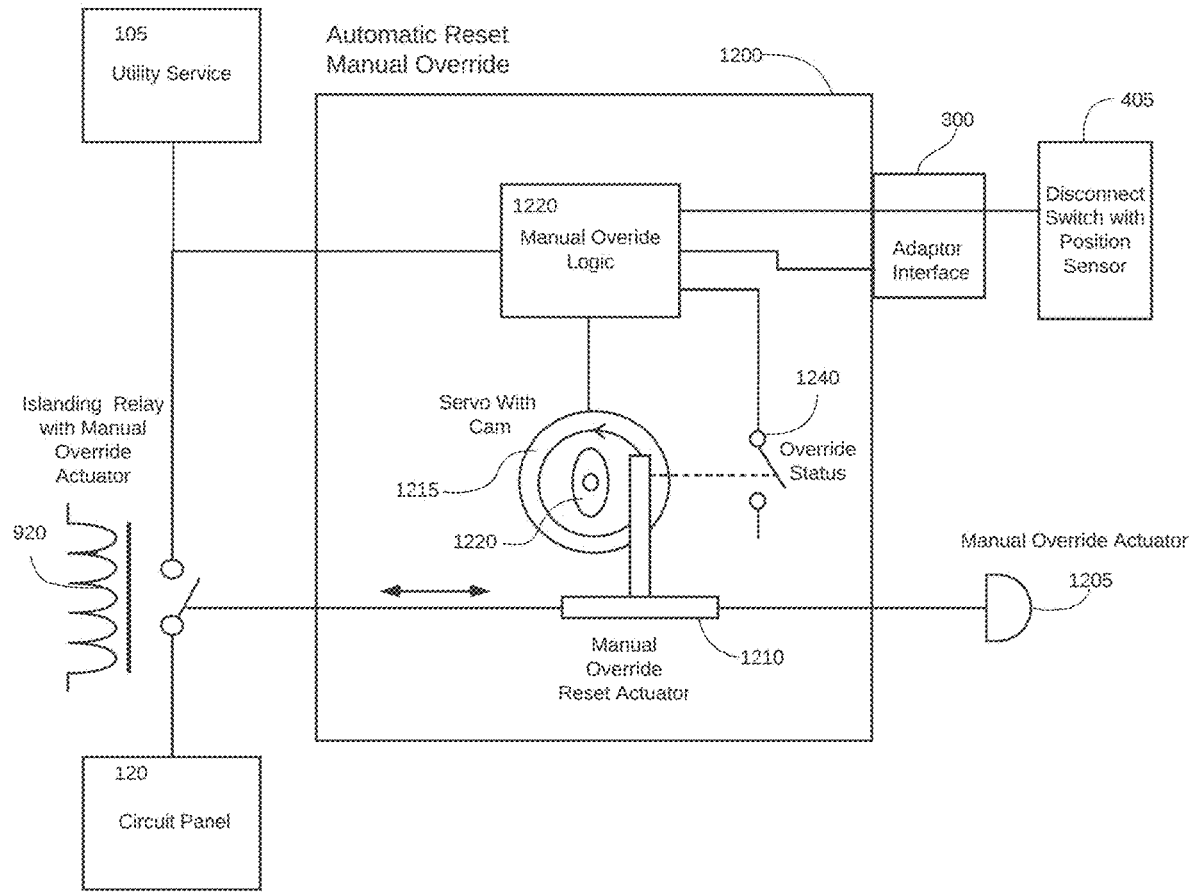
FIG. 12A shows a schematic diagram of an override component, in accordance with at least one example embodiment described and recited herein.

FIG. 12A Illustrates the automatic reset manual override (ARMO) 1200 component. This device allows for the manual operation of the Islanding relay 920 contacts under certain conditions. One possible condition is where the monitoring and control circuit 910 fails and the Islanding relay 920 is in the open position. If the utility power returns to service, the manual override actuator 1205 can be utilized to shut the islanding relay 920 contacts and restore power to the service panel 120.

The ARMO 1200 device is totally separate from the control circuit 210 so that failure in the control circuit is unlikely to affect the ARMO 1200 thus enabling power restoration if the utility power is present.

The ARMO 1200 will also automatically open and lockout the Islanding relay 920 contacts if utility power is lost. This prevents any power generation source that is connected to the load side of the islanding relay from feeding power back to the utility grid. This protects utility maintenance personnel from being exposed to energized components during a utility power outage.

The ARMO can be reset and locked out by moving the manual override reset actuator 1210 with a cam device 1220 causing the ARMO to be disabled. The cam device 1220 is motivated by a servo or solenoid 1215 that is controlled by the manual override logic 1220 depicted in FIG. 15.

FIG. 12A shows the manual override reset actuator 1210 and servo with cam 1220 device in the position that enables shutting of the islanding relay 920 using the manual override actuator 1205.

Figure 12B:
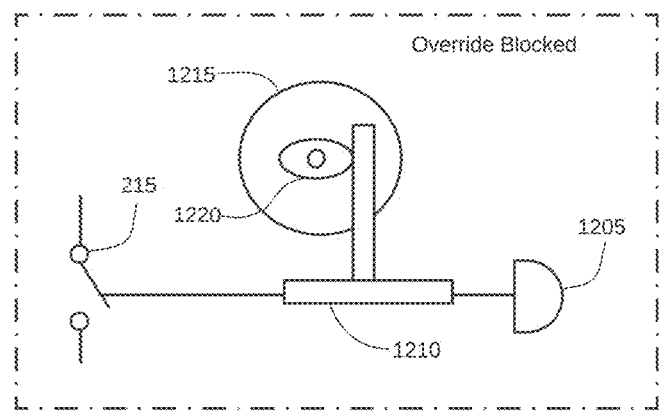
FIG. 12B shows a schematic diagram of the override reset actuator of FIG. 12A, in accordance with at least one example embodiment described and recited herein.

FIG. 12B shows the manual override reset actuator 1210 and cam device 1220 in the position that locks out the ability to shut the islanding relay contacts 920 using the manual override actuator 1205.

Figure 12C:
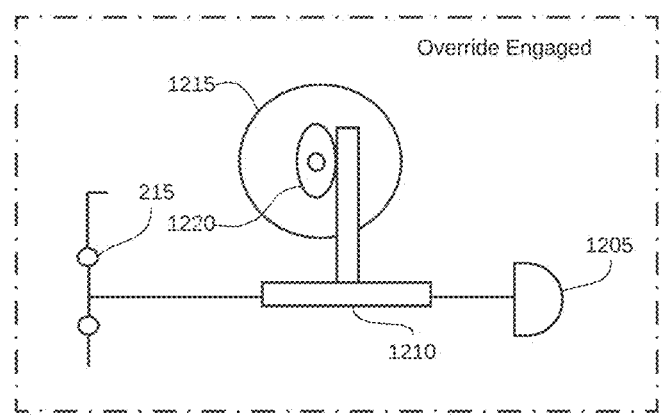
FIG. 12C also shows a schematic diagram of the override reset actuator of FIG. 12A, in accordance with at least one example embodiment described and recited herein.

FIG. 12C shows the manual override reset actuator 1210, the cam device 1220, and the islanding relay contacts 215 shut.

The override status switch 1240 indicates the position of the manual override actuator. This status can be used in the resilience logic depicted in FIG. 11.

Figure 13:
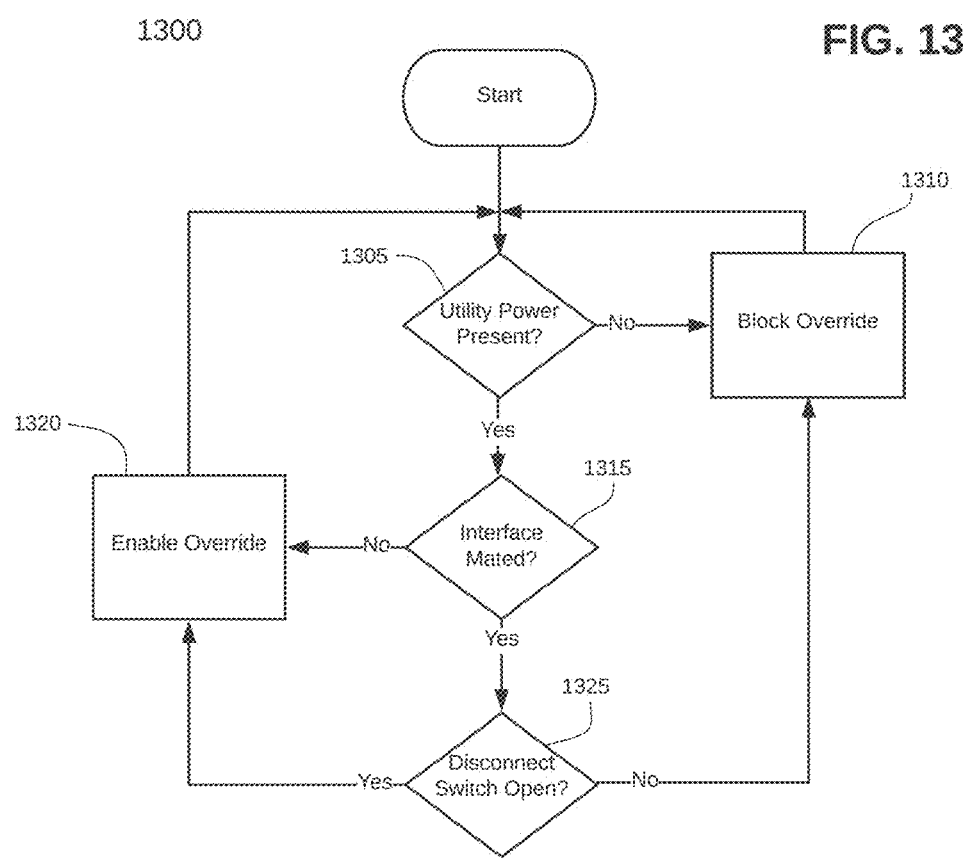
FIG. 13 shows an operational flow for implementing an override, in accordance with at least one example embodiment described and recited herein.

FIG. 13 illustrates ARMO 1200 Logic. The system starts 1300 when power is applied to the logic. The first decision is to determine if utility power is present 1305.

If utility power is not present, the override opens the islanding relay contacts and blocks the override 1310 from being actuated. Opening the islanding contacts prevents any grid forming generator from feeding power to the grid while maintenance personnel could be exposed to energized components during a utility power outage.

If utility power is present, then it determines if an adaptor interface 335 is mated 1315 with the islanding meter socket adaptor 300.

If the interface is not mated, then the override is enabled 1320 allowing the islanding relay to be shut. When the interface is not mated there is no path for grid forming generator power to flow back to the utility therefore it is safe to override the islanding relay. If the interface is mated, then the system determines if the disconnect switch is open 1325.

If the disconnect switch is open, then the override is enabled 1320. When the disconnect is open there is no path for grid forming generator power to flow back to the utility therefore it is safe to override the islanding relay.

If the disconnect is shut, the override is blocked 1310 from being actuated. Blocking the override prevents any grid forming generator from feeding power to the grid while maintenance personnel could be exposed to energized components during a utility power outage.

FIG. 14A depicts one embodiment of the islanding meter socket adaptor.

FIG. 14B illustrates the enclosure 1400 and main power carrying components. The meter jaws 1408, 1407, 1409, 1410, 1405, the mate socket jaws 1411, 1412, 1413, and the islanding relay 1406.

FIG. 14C illustrates the control electronics enclosure 1423, electronics PCB 1422, and control interface connectors 1420, 1421.

Figure 15A:
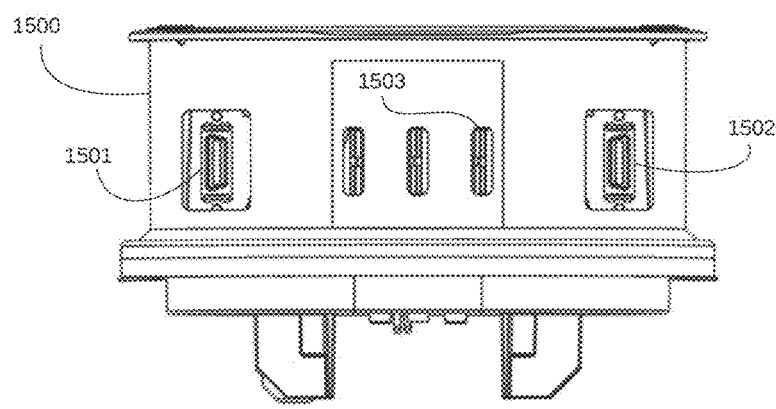
FIG. 15A shows a top view of an adaptor interface, in accordance with at least one example embodiment described and recited herein.

FIG. 15A illustrates the control interfaces 1501, 1502, and the power interfaces 1503.

Figure 15B:
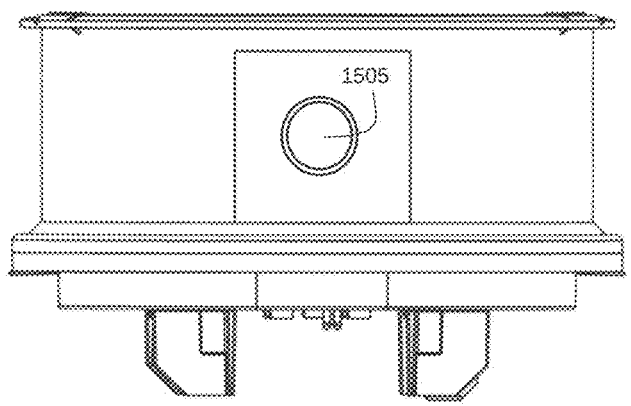
FIG. 15B shows a bottom view of an adaptor interface, in accordance with at least one example embodiment described and recited herein.

FIG. 15B illustrates the Automatic Reset Manual Override actuator 1505.

FIG. 16A depicts the back view of the meter socket adaptor this side mates with a standard meter socket.

FIG. 16B illustrates the meter socket adaptor enclosure 1610 back interface components including the meter socket stabs 1611, 1612, 1613, 1614.

Figure 17:
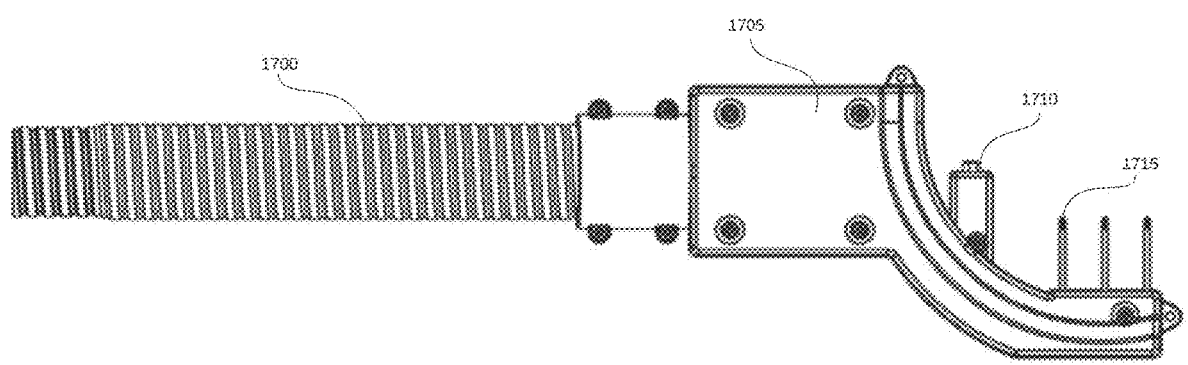
FIG. 17 shows a side view of an adaptor interface, in accordance with at least one example embodiment described and recited herein.

FIG. 17 illustrates the adaptor Interface 335 with a conduit 1700 to route the power and control cables to the electric vehicle charger interface 150. The other components are the interface casing 1705, the control interface connector 1710, and the power interface stabs 1715.

Figure 18:
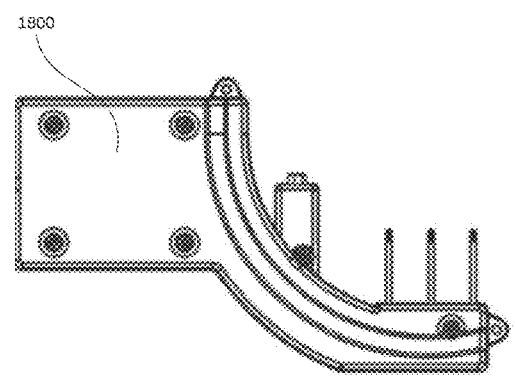
FIG. 18 shows a wireless adaptor interface, in accordance with at least one example embodiment described and recited herein.

FIG. 18 depicts the Adaptor Interface 335 without power or control cabling routed to the electric vehicle charger interface 150. This embodiment shows the configuration utilizing wireless communications between the adaptor and charger.

Figure 19A:
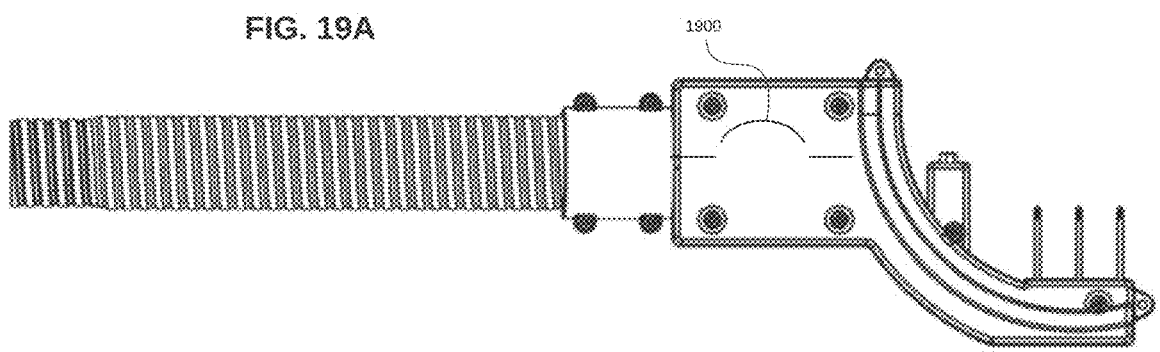
FIG. 19A shows a side view of an adaptor interface, in accordance with at least one other example embodiment described and recited herein.
Figure 19B:
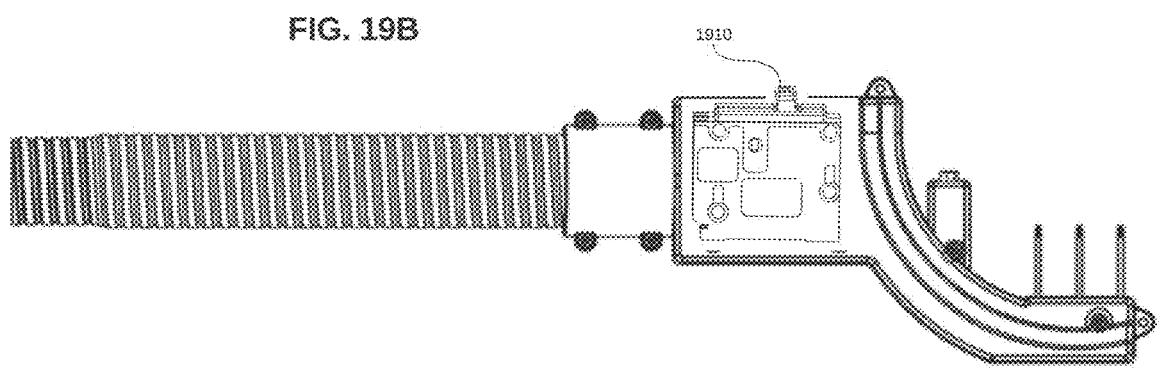
FIG. 19B shows components of the adaptor interface of FIG. 19A, in accordance with at least one example embodiment described and recited herein.

FIGS. 19A and 19B depict the adaptor with a disconnect and circuit protection devices in the adaptor 1900, 1910. This enables the system to be deployed without a separate fusible disconnect thus reducing the number of components needed to install at the site.

FIGS. 20A and 20B illustrate the mating of the interface adaptor 2010 and the meter socket adaptor 2000. FIG. 20A shows the adaptor unmated. FIG. 20B shows the adaptor mated.

Figure 21A:
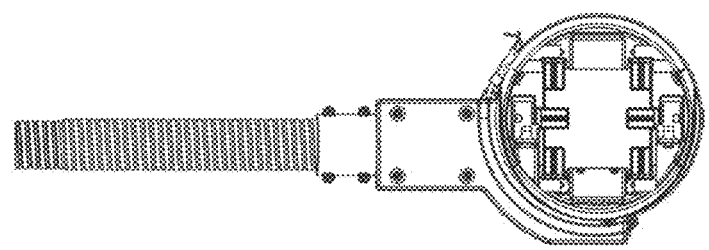
FIG. 21A shows a configuration of the adaptor interface, in accordance with at least one example embodiment described and recited herein.
Figure 21B:
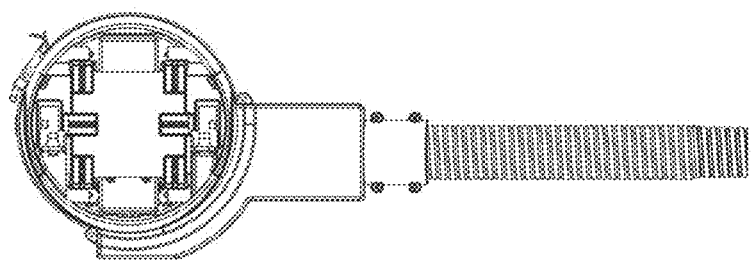
FIG. 21B shows another configuration of the adaptor interface, in accordance with at least one example embodiment described and recited herein.

FIGS. 21A and 21B show the interface adaptor mated in two different directions. The interface adaptor is symmetrical so it can be mated such that the conduit exits in the right-hand or left-hand directions. This enables installation flexibility to ease the placement of the other system components and avoid potential interferences.

Figure 22A:
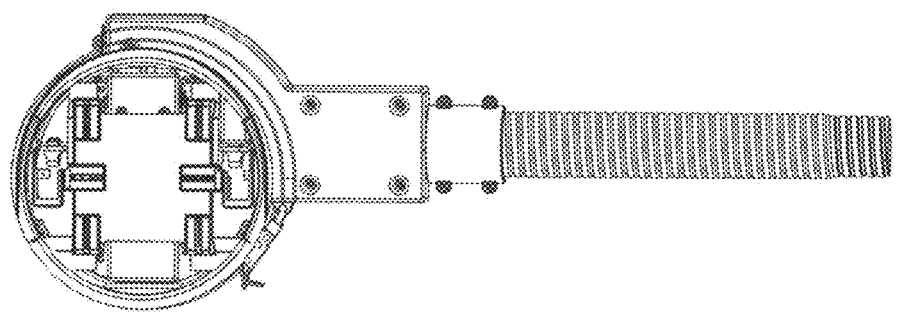
FIG. 22A shows another configuration of an adaptor interface, in accordance with at least one example embodiment described and recited herein.
Figure 22B:
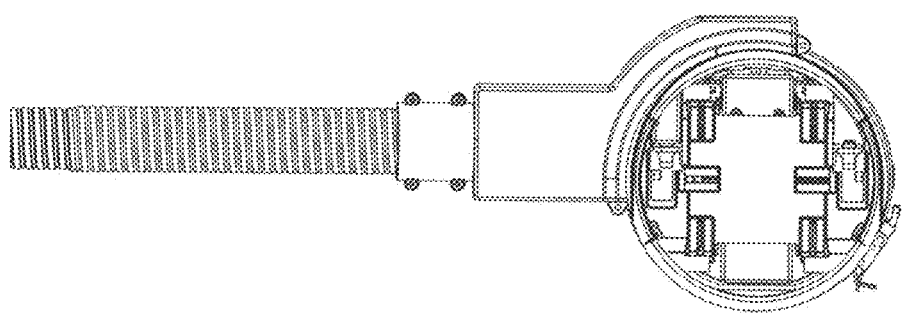
FIG. 22B shows another configuration of the adaptor interface of FIG. 22A, in accordance with at least one example embodiment described and recited herein.

FIGS. 22A and 22B show the meter and interface adaptors rotated 180 degrees to enable a "front of the meter" (FTM) connection. This configuration is depicted in FIG. 10. This configuration can also mate in right-hand or left-hand configurations to facilitate installation.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:
1. A system, comprising:
an islanding meter socket adaptor that electrically facilitates a bi-directional interface between an electric vehicle charger and a utility-side power source, via a meter socket that electrically interfaces the utility-side power source to a customer-side power distribution system,
wherein the islanding meter socket adaptor includes:
a pluggable AC power interface that electrically connects the electric vehicle charger to the islanding meter socket adaptor to facilitate the bi-directional power flow between the electric vehicle charger, the utility-side power source, and/or one or more customer-side loads, via the meter socket;
an islanding relay to regulate an electrical connection between the utility-side power source and the one or more customer-side loads,
a control interface that opens the islanding relay to electrically disconnect the islanding meter socket adaptor from the utility-side power source in an islanding mode such that the electrical vehicle charger is configured to be connected to the one or more customer-side loads via the meter socket, and
wherein the control interface transmits a signal to the electrical vehicle charger that the islanding relay is open in the islanding mode such that the electrical vehicle charger operates a grid-forming switch located within the electrical vehicle charger to connect the electrical vehicle charger to be connected to the one or more customer-side loads via the meter socket.

2. The system of claim 1, wherein the pluggable AC power interface houses connectors to pass backup power from the electric vehicle charger towards the utility-side power source.

3. The system of claim 2, wherein the connectors are electrically connected to the islanding meter socket adaptor.

4. The system of claim 1, wherein the pluggable AC power interface and the electric vehicle charger are communicatively connected wirelessly.

5. The system of claim 1, wherein the pluggable AC power interface and the electric vehicle charger are communicatively connected by a wired connection.

6. The system of claim 1, wherein the islanding meter socket adaptor includes an adaptor interface to provide electrical protection between the electric vehicle charger and utility-side power source.

7. The system of claim 6, wherein the adaptor interface includes circuit breakers.

8. The system of claim 1, wherein the islanding meter socket adaptor includes an override component to enable manual operation of the islanding relay.

9. The system of claim 1, wherein islanding meter socket adaptor includes a protection circuit that will prevent cumulative overloading of the meter socket.

10. The system of claim 1, wherein the islanding meter socket adaptor is further configured to communicate with the electric vehicle charger to modify operational parameters for an inverter connected to the electric vehicle charger.

11. An islanding meter socket adaptor configured to electrically facilitate a bi-directional interface between an electric vehicle charger and a utility-side power source, via a meter socket, the islanding meter socket adaptor comprising:
  a pluggable AC power interface that is configured to receive a pluggable adaptor interface coupled to the electric vehicle charger to electrically connect the electric vehicle charger to the islanding meter socket adaptor to facilitate the bi-directional power flow between the electric vehicle charger, the utility-side power source, and/or one or more customer-side loads, via the meter socket;
  an islanding relay to regulate an electrical connection between the utility-side power source and the one or more customer-side loads;
  contacts configured to plug into the meter socket; and
  a control interface configured to open the islanding relay to electrically disconnect the islanding meter socket adaptor from the utility-side power source in an islanding mode such that the electrical vehicle charger is configured to be connected to the one or more customer-side loads via the meter socket, and
  wherein the control interface transmits a signal to the electrical vehicle charger that the islanding relay is open in the islanding mode such that the electrical vehicle charger operates a grid-forming switch located within the electrical vehicle charger to connect the electrical vehicle charger to be connected to the one or more customer-side loads via the meter socket.

12. The islanding meter socket adaptor of claim 11, wherein the pluggable AC power interface houses connectors to pass backup power from the electric vehicle charger towards the utility-side power source.

13. The islanding meter socket adaptor of claim 11, further comprising an adaptor interface to provide electrical protection between the electric vehicle charger and utility-side power source.

14. The islanding meter socket adaptor of claim 13, wherein the adaptor interface includes circuit breakers.

15. The islanding meter socket adaptor of claim 11, further comprising an override component to enable manual operation of the islanding relay.

16. The islanding meter socket adaptor of claim 11, wherein the control interface is further configured to communicate with the electric vehicle charger to modify operational parameters for an inverter connected to the electric vehicle charger.

17. A system, comprising:
  an islanding meter socket adaptor that electrically facilitates a bi-directional interface between an electric vehicle charger and a utility-side power source, via a meter socket that electrically interfaces the utility-side power source to a customer-side power distribution system, and wherein the islanding meter socket adaptor includes:
    a pluggable AC power interface that electrically connects the electric vehicle charger to the islanding meter socket adaptor to facilitate the bi-directional power flow between the electric vehicle charger, the utility-side power source, and/or one or more customer-side loads, via the meter socket;
    an islanding relay to regulate an electrical connection between the utility-side power source and the meter socket, and
    a control interface configured to:
      open the islanding relay to electrically disconnect the islanding meter socket adaptor from the utility-side power source in an islanding mode such that the electrical vehicle charger is configured to be connected to the one or more customer-side loads via the meter socket; and
      transmit a signal to the electrical vehicle charger regarding the islanding mode such that the electrical vehicle charger operates a grid-forming switch located within the electrical vehicle charger to connect the electrical vehicle charger to be connected to the one or more customer-side loads via the meter socket, wherein the signal regarding the islanding mode includes the status of the islanding relay to indicate that the islanding relay is open.

* * * * *